(12) United States Patent  
Chen

(10) Patent No.: US 11,063,810 B2  
(45) Date of Patent: Jul. 13, 2021

(54) INFORMATION NOTIFICATION METHOD AND DEVICE

(71) Applicant: ZTE CORPORATION, Guangdong (CN)

(72) Inventor: Ran Chen, Shenzhen (CN)

(73) Assignee: ZTE Corporation, Guangdong (CN)

(*) Notice: Subject to any disclaimer, the term of this patent is extended or adjusted under 35 U.S.C. 154(b) by 22 days.

(21) Appl. No.: 16/604,929

(22) PCT Filed: Apr. 13, 2018

(86) PCT No.: PCT/CN2018/083100  
§ 371 (c)(1),  
(2) Date: Oct. 11, 2019

(87) PCT Pub. No.: WO2018/188662  
PCT Pub. Date: Oct. 18, 2018

(65) Prior Publication Data  
US 2020/0162307 A1 May 21, 2020

(30) Foreign Application Priority Data

Apr. 13, 2017 (CN) .......................... 201710240493.X

(51) Int. Cl.  
*H04L 12/24* (2006.01)  
*H04L 12/26* (2006.01)

(52) U.S. Cl.  
CPC ...... *H04L 41/0226* (2013.01); *H04L 41/5054* (2013.01); *H04L 43/10* (2013.01); *H04L 2212/00* (2013.01)

(58) Field of Classification Search  
CPC . H04L 41/5054; H04L 29/02; H04L 41/0226; H04L 2212/00; H04L 43/10;  
(Continued)

(56) References Cited

U.S. PATENT DOCUMENTS 9,077,561 B2* 7/2015 Kotrabasappa ......... H04L 45/24  
9,124,485 B2* 9/2015 Heron .................... H04L 12/287  
(Continued)

FOREIGN PATENT DOCUMENTS

CN 102868569 A 1/2013  
CN 103780420 A 5/2014  
EP 2645640 A2 10/2013

OTHER PUBLICATIONS

International Search Report of Application No. PCT/CN2018/083100—4 pages (dated Jun. 28, 2018).  
(Continued)

*Primary Examiner* — Man U Phan  
(74) *Attorney, Agent, or Firm* — Knobbe Martens Olson & Bear LLP

(57) ABSTRACT

Disclosed are an information notification method and device. The information notification method includes that: an In-band Operation Administration and Maintenance (IOAM) node encapsulates IOAM capability information by using an extended Border Gateway Protocol (BGP)-Link State (LS) or encapsulates the IOAM capability information by using a Network Configuration Protocol (NETCONF), and sends a BGP-LS packet or a NETCONF message carrying the IOAM capability information to a predetermined node.

17 Claims, 4 Drawing Sheets

(58) Field of Classification Search
CPC ............. H04L 41/0246; H04L 41/0631; H04L 12/4633; H04L 12/4641; H04L 12/56; H04L 41/04; H04L 41/0677; H04L 43/24; H04L 53/04; H04L 45/50; H04L 12/24; H04L 12/26
USPC .......................................................... 370/241
See application file for complete search history.

(56) References Cited

U.S. PATENT DOCUMENTS

| | | | |
|---|---|---|---|
| 9,967,191 B2* | 5/2018 | Frost | H04L 47/125 |
| 9,992,056 B2* | 6/2018 | Ward | H04L 43/04 |
| 10,355,983 B2* | 7/2019 | Penno | H04L 41/5009 |
| 10,454,828 B2* | 10/2019 | Pignataro | H04L 41/12 |
| 10,581,733 B2* | 3/2020 | Peng | H04L 45/54 |
| 10,582,027 B2* | 3/2020 | Bhandari | H04L 67/2804 |
| 10,588,012 B2* | 3/2020 | Pignataro | H04L 41/00 |
| 10,652,078 B2* | 5/2020 | Ward | H04L 12/4633 |
| 10,742,551 B2* | 8/2020 | Dara | H04L 69/22 |
| 2013/0259056 A1 | 10/2013 | Kotrabasappa et al. | |
| 2015/0109938 A1 | 4/2015 | Zhang et al. | |
| 2018/0062991 A1* | 3/2018 | Nainar | H04L 45/42 |
| 2020/0336360 A1* | 10/2020 | Ward | H04L 41/0677 |

OTHER PUBLICATIONS

Brockners et al., "Requirements for In-situ OAM draft-brockners-inband-oam-requirements-03"—24 pages (Mar. 13, 2017).

Brockners, F. et al., "Encapsulations for In-situ OAM Data draft-brockners-inband-oarn-transport-03" ippm—Internet-Draft, Mar. 12, 2017, pp. 1-21, XP015118625.

Brockners, F. et al., "Data Fields for In-situ OAM draft-brockners-inband-oam-data-04" ippm—Internet-Draft, Mar. 29, 2017, pp. 1-25, XP015119031.

Eckert, T. et al., "Traffic Enginering for Bit Index Explicit Replication BIER-TE draft-eckert-bier-te-arch-01" Networking Working Group—Internet-Draft, Jul. 5, 2015, pp. 1-23, XP015107276.

Gredler, H. et al., "North-Bound Distribution of Link-State and Traffic Engineering (TE) Information Using BGP" Internet Engineering Task Force (IETF), Mar. 2016, pp. 1-48, XP015110974.

Chen, Ran et al., "BGP Link-State extensions for BIER; draft-chenvgovindan-bier-bgp-is-bier-ext-00.txt" Networking Working Group—Internet-Draft, Mar. 12, 2016, pp. 1-8, XP015111706.

Supplementary European Search Report for EP 18784280 dated Nov. 27, 2020.

* cited by examiner

| Type | Length |
|---|---|
| Option type | Reserved |
| Option Sub-TLV ||

| Type | Length |
|---|---|
| F | Reserved |

| Type | Length |
|---|---|
| Reserved ||
FIG. 8
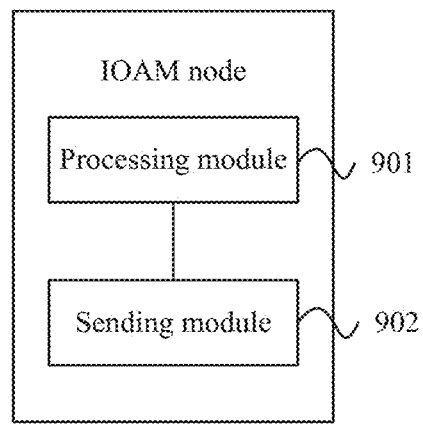
FIG. 9
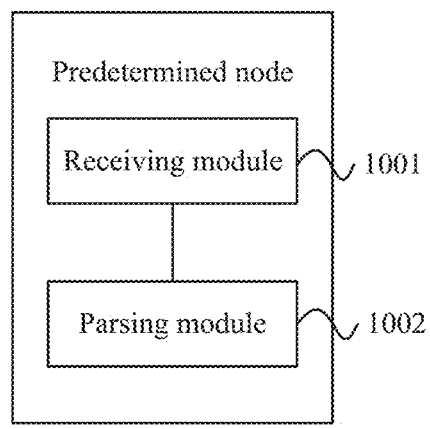
FIG. 10

INFORMATION NOTIFICATION METHOD AND DEVICE

CROSS REFERENCE TO RELATED APPLICATIONS

This is a U.S. National Stage Application, filed under 35 U.S.C. 371, of International Patent Application No. PCT/CN2018/083100, filed on Apr. 13, 2018, which claims priority to Chinese patent application No. 201710240493.X filed on Apr. 13, 2017, contents of both of which are incorporated herein by reference in their entireties.

TECHNICAL FIELD

The present disclosure relates to the field of communications, for example, to an information notification method and device.

BACKGROUND

The Internet Engineering Task Force (IETF) proposes In-band Operation Administration and Maintenance (IOAM). The IOAM is sent along with a data packet. An additional control plane packet is not required to send OAM data. The IOAM is typically deployed within a specific domain. The IOAM can implement complex OAM functions such as multiple path tracing, path proofing, and Service-Level Agreement (SLA) authentication.

Depending on a deployment, the IOAM may be used in different scenarios, such as Internet Protocol Version 6 (IPV6), Virtual Extensible LAN-Generic Protocol Extension (VXLAN-GPE), Service Function Chaining (SFC) and Segment Routing (SR). However, in an IOAM scenario, an IOAM function cannot be implemented through a node outside an IOAM domain.

SUMMARY

The embodiments of the present application provide an information notification method and device to implement that a predetermined node is able to collect information of a node which supports an IOAM function in an IOAM domain.

The embodiments of the present application provide an information notification method. The method includes steps described below.

An IOAM node encapsulates IOAM capability information by using an Extended Border Gateway Protocol (BGP)-Link State (LS), or encapsulates the IOAM capability information by using a Network Configuration Protocol (NETCONF).

The IOAM node sends a BGP-LS packet or a NETCONF message carrying the IOAM capability information to a predetermined node, where the predetermined node is a controller in a network management system or a network manager in the network management system. The embodiments of the present application provide another information notification method. The method includes steps described below.

A predetermined node receives a BGP-LS packet or a NETCONF message sent by an IOAM node.

The predetermined node parses IOAM capability information notified by the IOAM node in the BGP-LS packet or the NETCONF message, where the predetermined node is a controller in a network management system or a network manager in the network management system.

The embodiments of the present application provide an information notification device, applied to an IOAM node. The device includes a processing module and a sending module.

The processing module is configured to encapsulate IOAM capability information by using an extended BGP-LS or encapsulate the IOAM capability information by using a NETCONF.

The sending module is configured to send a BGP-LS packet or a NETCONF message carrying the IOAM capability information to a predetermined node, where the predetermined node is a controller in a network management system or a network manager in the network management system.

The embodiments of the present application provide another information notification device, applied to a controller in a network management system or a network manager in the network management system. The device includes a receiving module and a parsing module.

The receiving module is configured to receive a BGP-LS packet or a NETCONF message sent by an IOAM node.

The parsing module is configured to parse IOAM capability information notified by the IOAM node in the BGP-LS packet or the NETCONF message, where the predetermined node is a controller in a network management system or a network manager in the network management system.

The embodiments of the present application provide an information notification device, applied to an IOAM node. The device includes a memory and at least one processor, where the memory is configured to store an information notification program which, when read and executed by the processor, implements the above information notification method applied to the IOAM node side.

The embodiments of the present application provide another information notification device, applied to a controller in a network management system or a network manager in the network management system. The device includes a memory and at least one processor, where the memory is configured to store an information notification program which, when read and executed by the processor, implements the above information notification method applied to the predetermined node side.

The embodiments of the present application further provide a machine readable medium configured to store a computer program which, when executed by a processor, implements the above information notification method applied to the IOAM node side.

The embodiments of the present application further provide another machine readable medium configured to store a computer program which, when executed by a processor, implements the above information notification method applied to the controller in the network management system or the network manager in the network management system.

The embodiments of the present application collect information of a node which supports IOAM functions in an IOAM domain through the extended BGP-LS or the NETCONF, so that a predetermined node is able to collect information of the node which supports IOAM functions in the IOAM domain.

BRIEF DESCRIPTION OF DRAWINGS

FIG. 8 is a schematic diagram of a format of an IOAM Proof of Transit Option Sub-TLV according to an embodiment of the present application;

FIG. 9 is a schematic diagram of an information notification device according to an embodiment of the present application; and FIG. 10 is another schematic diagram of an information notification device according to an embodiment of the present application.

DETAILED DESCRIPTION

Among multiple edge nodes in an IOAM domain, an edge node that embeds an OAM data packet into a data packet is also referred to as an IOAM encapsulation node, and an edge node that is about to leave the IOAM domain and removes the OAM data packet is also referred to as an IOAM de-capsulation node. In an embodiment, a proofing method of an IOAM path includes steps described below. An IOAM encapsulation node embeds an OAM data packet into a data packet. An IOAM forwarding node fills relevant OAM information into the OAM data packet according to a certain algorithm. An IOAM de-capsulation node checks whether the path is consistent with a configured path according to the OAM information filled into the OAM data packet by the IOAM forwarding node and removes the OAM data packet. The node that implements the path proofing may be a predetermined node set outside the IOAM domain, for example, the external predetermined node completes path proofing based on a complete in-situ OAM data packet.

Figure 1:
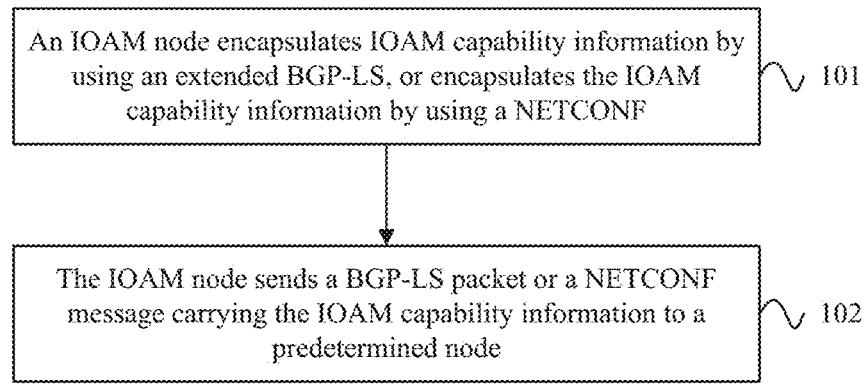
FIG. 1 is a flowchart of an information notification method according to an embodiment of the present application.

As shown in FIG. 1, the embodiments of the present application provide an information notification method. The method includes the steps described below.

In step 101, an IOAM node encapsulates IOAM capability information by using an extended BGP-LS or encapsulates the IOAM capability information by using a NETCONF.

In an exemplary embodiment, the IOAM node may encapsulate the IOAM capability information in two manners, including: encapsulating the IOAM capability information by using the extended BGP-LS or encapsulating the IOAM capability information by using the NETCONF.

In step 102, the IOAM node sends a BGP-LS packet or a NETCONF message carrying the IOAM capability information to a predetermined node.

In the exemplary embodiment, the IOAM node may encapsulate the IOAM capability information using the extended BGP-LS, and send the BGP-LS packet carrying the IOAM capability information to the predetermined node; or the IOAM node may encapsulate the IOAM capability information using the NETCONF and send the NETCONF message carrying the IOAM capability information to the predetermined node.

In the exemplary embodiment, the predetermined node may be a controller in a network management system or a network manager in the network management system.

In the exemplary embodiment, the step in which the IOAM node encapsulates the IOAM capability information by using the extended BGP-LS may include: the IOAM node adds at least one BGP-LS attribute, and encapsulates the IOAM capability information by using the added at least one BGP-LS attribute.

In the exemplary embodiment, the added at least one BGP-LS attribute may include at least one of: a node attribute, a prefix attribute, or a link attribute.

In the exemplary embodiment, the step in which the IOAM node encapsulates the IOAM capability information by using the NETCONF may include: the IOAM node encapsulates the IOAM capability information in a HELLO message of the NETCONF.

In the exemplary embodiment, the IOAM capability information may include an IOAM type, and the IOAM type may include: IOAM Tracing Option, IOAM Proof of Transit Option, and In-situ OAM Edge-to-Edge Option.

In the exemplary embodiment, the IOAM capability information may further include at least one of: IOAM Tracing Option Subtype, IOAM Proof of Transit Option Subtype, or In-situ OAM Edge-to-Edge Option Subtype.

In the exemplary embodiment, when the IOAM node is an IOAM encapsulation node, the IOAM capability information may include at least one of: an IOAM type of the IOAM encapsulation node or an IOAM type of a predetermined IOAM node in an IOAM domain collected by the IOAM encapsulation node in advance.

Figure 2:
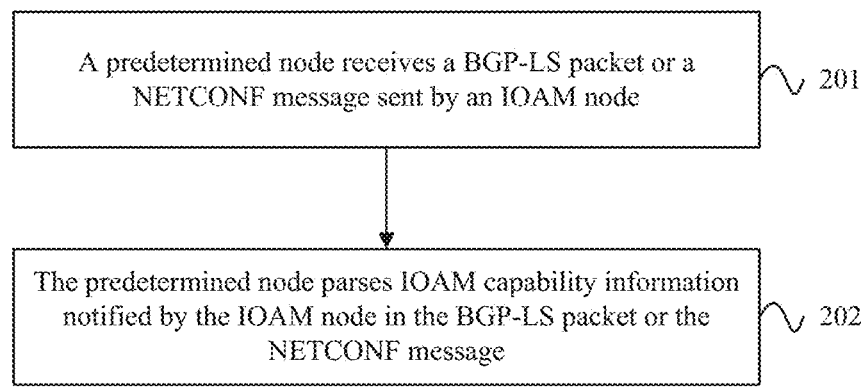
FIG. 2 is another flowchart of an information notification method according to an embodiment of the present application.

As shown in FIG. 2, an embodiment of the present application further provides an information notification method. The method includes the steps described below.

In step 201, a predetermined node receives a BGP-LS packet or a NETCONF message sent by an IOAM node.

In step 202, the predetermined node parses IOAM capability information notified by the IOAM node in the BGP-LS packet or the NETCONF message.

In an exemplary embodiment, the predetermined node may parse the IOAM capability information notified by the IOAM node in the BGP-LS packet after receiving the BGP-LS packet sent by the IOAM node, or the predetermined node may parse the IOAM capability information notified by the IOAM node in the NETCONF message after receiving the NETCONF message sent by the IOAM node.

In the exemplary embodiment, the predetermined node may be a controller in a network management system or a network manager in the network management system.

In the exemplary embodiment, the IOAM capability information may be encapsulated in an added BGP-LS attribute or carried in a HELLO message of the NETCONF.

In the exemplary embodiment, the added BGP-LS attribute may include at least one of: a node attribute, a prefix attribute, or a link attribute.

In the exemplary embodiment, the IOAM capability information may include an IOAM type, and the IOAM type includes: IOAM Tracing Option, IOAM Proof of Transit Option, and In-situ OAM Edge-to-Edge Option.

In the exemplary embodiment, the IOAM capability information may further include at least one of: IOAM Tracing Option Subtype, IOAM Proof of Transit Option Subtype, or In-situ OAM Edge-to-Edge Option Subtype.

In the exemplary embodiment, when the IOAM node is an IOAM encapsulation node, the IOAM capability information may include one or more of: an IOAM type of the IOAM encapsulation node or an IOAM type of a predetermined IOAM node in an IOAM domain collected by the IOAM encapsulation node in advance.

Figure 3:
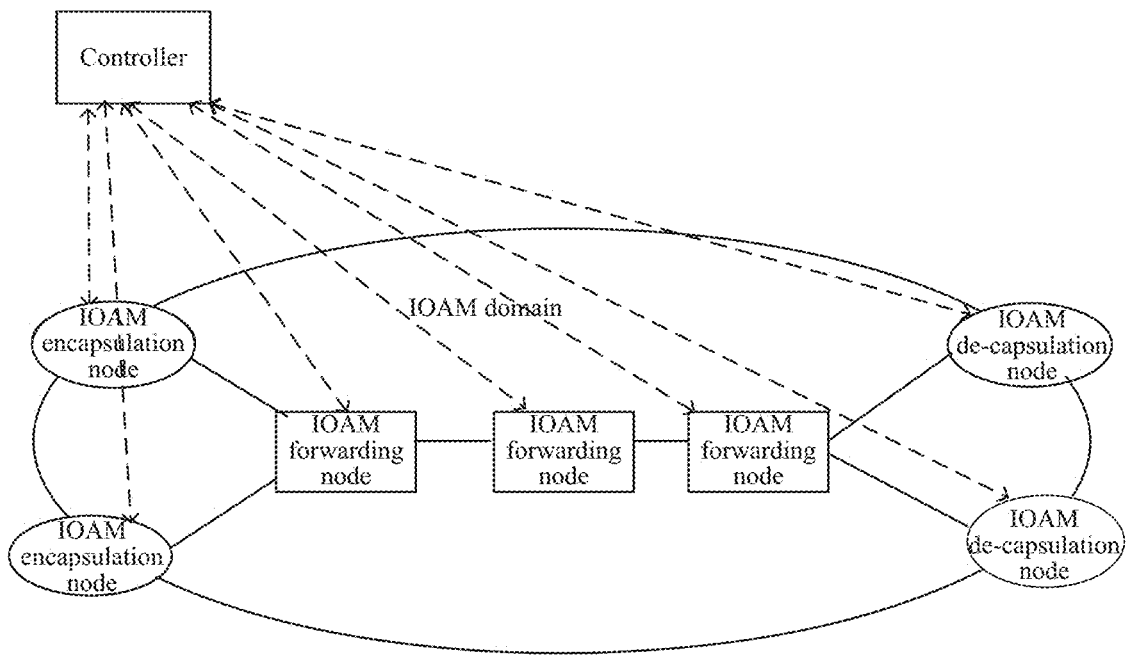
FIG. 3 is a schematic diagram of a network connection according to an embodiment of the present application.
Figure 4:
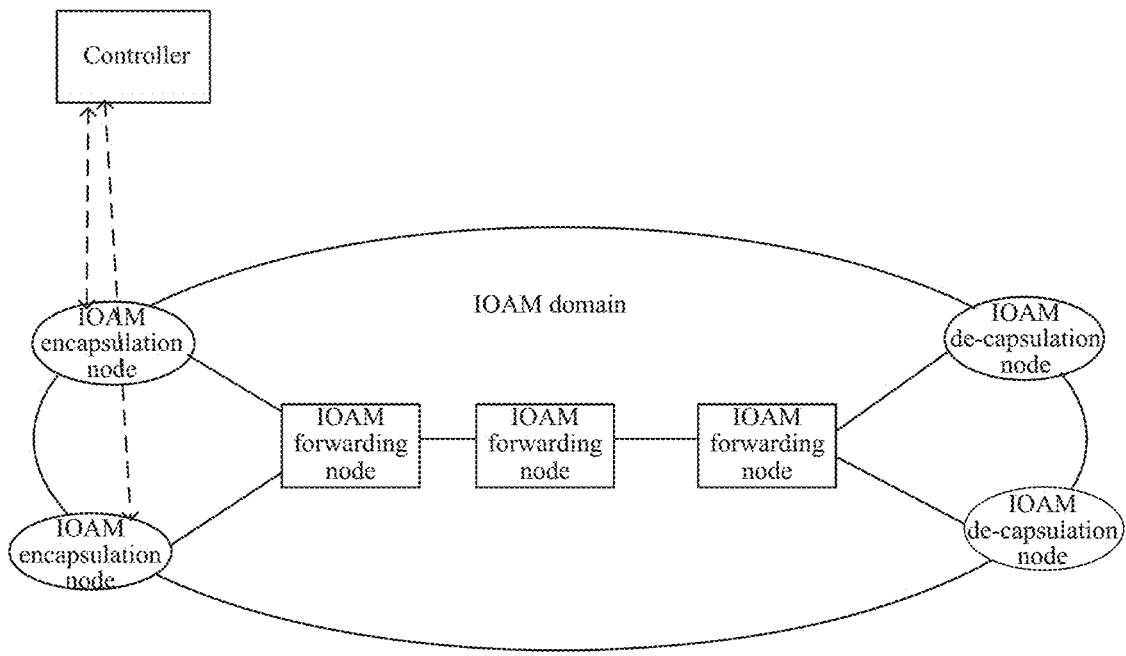
FIG. 4 is a schematic diagram of another network connection according to an embodiment of the present application.
Figures 5, 6, 7:
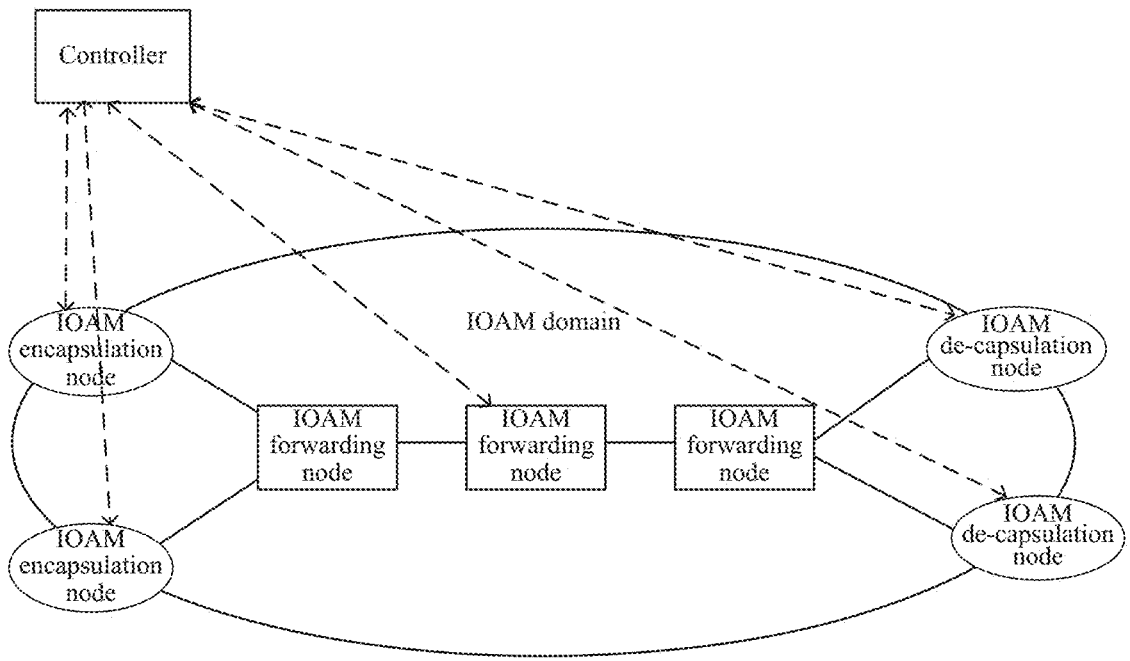
FIG. 5 is a schematic diagram of another network connection according to an embodiment of the present application.
FIG. 6 is a schematic diagram of a format of an IOAM capability Type Length Value (TLV) according to an embodiment of the present application.
FIG. 7 is a schematic diagram of a format of an IOAM Tracing Option Sub-TLV according to an embodiment of the present application.

In an embodiment, IOAM domains shown in FIG. 3 to FIG. 5 may be domains supporting Segment Routing (SR), and multiple IOAM nodes in the figures may support a SR technology.

Taking FIG. 3 as an example, in an IOAM domain shown in FIG. 3, an IOAM encapsulation node may be referred to as an SR ingress node, an IOAM de-capsulation node may be referred to as an SR egress node, and an intermediate IOAM forwarding node may be referred to as an SR forwarding node. As shown in FIG. 3, a data packet is sent from the IOAM encapsulation node to the IOAM de-capsulation node.

In FIG. 3, a node supporting IOAM in the IOAM domain has interaction with a controller (corresponding to the predetermined node described above), that is, a node supporting the SR technology in an SR domain has interaction with the controller. In FIG. 4, the IOAM encapsulation node (or the SR ingress node) has interaction with the controller. In FIG. 5, a specified IOAM node has interaction with the controller.

In another embodiment, IOAM nodes that interact with the controller depend on an actual deployment, and are not limited in the present application.

In the embodiment, a process of an information notification method includes steps described below.

In step 1101, a relevant node (for example, a node supporting IOAM in the IOAM domain in FIG. 3, that is, a node supporting the SR technology in the SR domain, or the IOAM encapsulation node or the SR ingress node in FIG. 4, or the specified node in FIG. 5) in the IOAM domain notifies, through Type Length Value (TLV) of the IOAM capability information carried by the extended BGP-LS attribute, the controller that the relevant note supports an IOAM capability.

In an embodiment, the extended BGP-LS attribute may include a newly added node attribute and link attribute. Since SR information is related to node information and each link may also have its own IOAM capability information, in an SR scenario, an IOAM capability TLV is carried through an extended node attribute and link attribute. With respect to definitions of the node attribute and the link attribute, reference may be made to standard RFC 7752.

In an embodiment, a detailed format of an IOAM capability TLV is seen in FIG. 6. In FIG. 6, a Type field indicates the TLV as an IOAM-capability TLV; a Length field indicates a total length of the TLV; and an Option type field indicates an IOAM type. The current IETF defines the following IOAM types: IOAM Tracing Option, IOAM Proof of Transit Option, and In-situ OAM Edge-to-Edge Option. A Reserved field is a field reserved and to be extended.

In an embodiment, one or more Option sub-TLVs may also be defined. The Option Sub-TLV may include at least one of: IOAM Tracing Option Sub-TLV, IOAM Proof of Transit Option Sub-TLV, or In-situ OAM Edge-to-Edge Option Sub-TLV.

FIG. 7 is a schematic diagram of a format of the IOAM Tracing Option Sub-TLV. F bytes are used to indicate a type of path tracing, and the path tracing includes the following two types:

Pre-allocated Trace Option and Incremental Trace Option.
FIG. 8 is a schematic diagram of a format of the IOAM Proof of Transit Option Sub-TLV. The IOAM Proof of Transit Option Sub-TLV defines the following three types of IOAM: Proof of Transit (POT), Network Service Host metadata (NSH metadata) and Segment Routing Proof of Transit (SR POT).

In an embodiment of the present disclosure, as shown in FIG. 4, if an IOAM encapsulation node (or an SR ingress node) interacts with a controller, the IOAM encapsulation node (or the SR ingress node) may collect IOAM capabilities supported by relevant nodes in an IOAM domain through an Interior Gateway Protocol (IGP) and uniformly report the IOAM capabilities to the controller.

In step 1102, after receiving a BGP-LS packet, the controller parses the BGP-LS packet to know the nodes that support the IOAM capabilities.

In an embodiment, IOAM domains shown in FIG. 3 to FIG. 5 may also be VXLAN domains, and all IOAM nodes in the figures support a VXLAN technology.

Taking FIG. 3 as an example, in the IOAM domain shown in FIG. 3, an IOAM encapsulation node may be referred to as a Network Virtual Edge (NVE), an IOAM de-capsulation node may be referred to as an NVE, and an intermediate IOAM forwarding node may be referred to as a VXLAN forwarding node. As shown in FIG. 3, a data packet is sent from the IOAM encapsulation node to the IOAM de-capsulation node.

In FIG. 3, a node that may support IOAM in the IOAM domain has interaction with a controller (corresponding to the predetermined node described above), and a node supporting the VXLAN technology in the VXLAN domain has interaction with the controller. In FIG. 4, the IOAM encapsulation node (or NVE) has interaction with the controller. In FIG. 5, a specified IOAM node (or a VXLAN node) has interaction with the controller.

In another embodiment, IOAM nodes that interact with the controller depend on an actual deployment, and are not limited in the present application.

In the embodiment, a process of an information notification method includes steps described below.

In step 1201, a relevant node (for example, a node supporting IOAM in the IOAM domain in FIG. 3, that is, a node supporting the VXLAN technology in the VXLAN domain, or the IOAM encapsulation node or the NVE in FIG. 4, or the specified node or the VXLAN node in FIG. 5) in the IOAM domain carries IOAM capability parameters through an extended NETCONF, and notifies the controller that the relevant note supports the IOAM capability.

In an embodiment, when a link is established between a relevant node in an IOAM domain and the controller through the NETCONF, the relevant node and the controller send HELLO packets to each other. The HELLO packet sent by the relevant node in the IOAM domain to the controller carries capability information of the relevant node in the IOAM domain, for example, the capability information may be the following packet in Extensible Markup Language (XML) format, where the part in bold is newly added IOAM capability related information of the relevant node in the IOAM domain, and the IOAM capability related information includes an IOAM type. The IOAM type includes: IOAM Tracing Option, IOAM Proof of Transit Option and In-situ OAM Edge-to-Edge Option. In an embodiment, in the IOAM Tracing Option type, the path tracing type includes: Pre-allocated Trace Option and Incremental Trace Option.

```
<hello xmlns="urn:ietf:params:xml:ns:netconf:base:1.0">
    <capabilities>
        <capability>
            urn:ietf:params:netconf:base:1.1
        </capability>
        <capability>
            urn:ietf:params:netconf:capability:startup:1.0
        </capability>
        <capability>
        urn:ietf:params:IOAM-netconf:capability: in-suit OAM Tracing
        Option:
        Pre-allocated Trace Option
        </capability>
        <capability>
        urn:ietf:params:IOAM-netconf:capability: in-suit OAM Tracing
        Option:
        Incremental Trace Option
        </capability>
        <capability>
        urn:ietf:params:IOAM-netconf:capability: in-suit OAM Proof of
        Transit
        Option
        </capability>
        <capability>
        urn:ietf:params:IOAM-netconf:capability: In-situ OAM
        Edge-to-Edge
        Option
        </capability>
    </capabilities>
    <session-id>4</session-id>
</hello>
```

In an embodiment, as shown in FIG. 4, if an IOAM encapsulation node (or an NVE) interacts with a controller, the IOAM encapsulation node (or the NVE) may collect IOAM capabilities of relevant nodes in an IOAM domain through an IGP and report the IOAM capabilities together to the controller.

In step 1202, after receiving a NETCONF message carrying IOAM capability parameters, the controller parses the NETCONF message to know the nodes that support the IOAM capabilities.

In an embodiment, IOAM domains shown in FIG. 3 to FIG. 5 may be Bit Index Explicit Replication (BIER) domains, and all IOAM nodes in the figures also support a BIER technology.

Taking FIG. 3 as an example, in an IOAM domain shown in FIG. 3, an IOAM encapsulation node may be referred to as a BIER ingress node, an IOAM de-capsulation node may be referred to as a BIER egress node, and an intermediate IOAM forwarding node may be referred to as a BIER forwarding node. As shown in FIG. 3, a data packet is sent from the IOAM encapsulation node to the IOAM de-capsulation node.

In FIG. 3, a node supporting the IOAM in the IOAM domain has interaction with a controller (corresponding to the predetermined node described above), that is, a node supporting the BIER technology in a BIER domain has interaction with the controller. In FIG. 4, the IOAM encapsulation node (or the BIER ingress node) has interaction with the controller. In FIG. 5, a specified IOAM node has interaction with the controller.

In another embodiment, IOAM nodes that interact with the controller are determined based on an actual deployment, and are not limited in the present application.

In the embodiment, a process of an information notification method includes steps described below.

In step 1301, a relevant node (for example, a node supporting IOAM in the IOAM domain in FIG. 3, that is, a node supporting the BIER technology in the BIER domain, or the IOAM encapsulation node or the BIER ingress node in FIG. 4, or the specified node in FIG. 5) in the IOAM domain carries an IOAM capability information TLV through an extended BGP-LS attribute, and notifies the controller that the relevant note supports an IOAM capability.

The extended BGP-LS attribute may include a newly added prefix attribute. Since BIER information is associated with a prefix, in a BIER scenario, a Prefix Attribute TLV is extended to carry the IOAM capability TLV. With respect to the format of the BGP-LS Prefix Attribute TLV, reference may be made to standard RFC 7752.

In an embodiment, a detailed format of an IOAM capability TLV may be seen in FIG. 6. In FIG. 6, a Type field identifies the TLV as an IOAM-capability TLV; a Length field is a total length of the TLV; an Option type field is an IOAM type, and now the IETF defines the IOAM type: IOAM Tracing Option, IOAM Proof of Transit Option, and In-situ OAM Edge-to-Edge Option; and a Reserved field is a field reserved and to be extended.

In an embodiment, one or more Option sub-TLVs may also be defined. The Option Sub-TLV may include at least one of: IOAM Tracing Option Sub-TLV, IOAM Proof of Transit Option Sub-TLV, or In-situ OAM Edge-to-Edge Option Sub-TLV.

FIG. 7 is a schematic diagram of a format of the IOAM Tracing Option Sub-TLV. F bytes are used to indicate a type of path tracing, and the path tracing includes the following two types: Pre-allocated Trace Option and Incremental Trace Option.

FIG. 8 is a schematic diagram of a format of the IOAM Proof of Transit Option Sub-TLV. The IOAM Proof of Transit Option Sub-TLV includes and defines three IOAM types: general POT, NSH metadata, and SR POT.

In the embodiment, as shown in FIG. 4, if an IOAM encapsulation node (or a BIER ingress node) interacts with a controller, the IOAM encapsulation node or the BIER ingress node is able to collect IOAM capabilities supported by relevant nodes in an IOAM domain through an IGP and report the IOAM capabilities to the controller.

In step 1302, after receiving a BGP-LS packet, the controller parses the BGP-LS packet to know the nodes that support the IOAM capabilities.

In addition, as shown in FIG. 9, the embodiments of the present application further provide an information notification device, applied to an IOAM node. The device includes a processing module 901 and a sending module 902.

The processing module 901 is configured to encapsulate IOAM capability information by using an extended BGP-LS, or encapsulate the IOAM capability information by using a NETCONF.

The sending module 902 is configured to send a BGP-LS packet or a NETCONF message carrying the IOAM capability information to a predetermined node.

The predetermined node may be a controller in a network management system or a network manager in the network management system.

In an exemplary embodiment, the processing module 901 may be configured to encapsulate the IOAM capability information by using the extended BGP-LS in the following manner: adding at least one BGP-LS attribute; and encapsulating the IOAM capability information with the added at least one BGP-LS attribute. The added at least one BGP-LS attribute includes at least one of: a node attribute, a prefix attribute, or a link attribute.

In the exemplary embodiment, the processing module 901 may be configured to encapsulate the IOAM capability information with the NETCONF by encapsulating the IOAM capability information in a HELLO message of the NETCONF.

In the exemplary embodiment, the IOAM capability information may include an IOAM type, and the IOAM type may include: IOAM Tracing Option, IOAM Proof of Transit Option, and In-situ OAM Edge-to-Edge Option.

In the exemplary embodiment, the IOAM capability information may further include at least one of: IOAM Tracing Option Subtype, IOAM Proof of Transit Option Subtype, or In-situ OAM Edge-to-Edge Option Subtype.

In the exemplary embodiment, when the IOAM node is an IOAM encapsulation node, the IOAM capability information may include at least one of: an IOAM type of the IOAM encapsulation node or an IOAM type of a predetermined IOAM node in an IOAM domain collected by the IOAM encapsulation node in advance.

As shown in FIG. 10, the embodiments of the present application further provide an information notification device, applied to a predetermined node. The device includes a receiving module 1001 and a parsing module 1002.

The receiving module 1001 is configured to receive a BGP-LS packet or a NETCONF message sent by an IOAM node.

The parsing module is configured to parse IOAM capability information notified by the IOAM node in the BGP-LS packet or the NETCONF message.

The predetermined node may be a controller in a network management system or a network manager in the network management system.

The IOAM capability information may be encapsulated in an added BGP-LS attribute or carried in a HELLO message of a NETCONF, where the added BGP-LS attribute may include at least of: a node attribute, a prefix attribute, or a link attribute.

The IOAM capability information may include an IOAM type, and the IOAM type may include: IOAM Tracing Option, IOAM Proof of Transit Option, and In-situ OAM Edge-to-Edge Option.

The IOAM capability information may further include at least one of: IOAM Tracing Option Subtype, IOAM Proof of Transit Option Subtype, or In-situ OAM Edge-to-Edge Option Subtype.

In an exemplary embodiment, when the IOAM node is an IOAM encapsulation node, the IOAM capability information may include at least one of: an IOAM type of the IOAM encapsulation node or an IOAM type of a predetermined IOAM node in an IOAM domain collected by the IOAM encapsulation node in advance.

For the relevant description of the information notification device, reference may be made to the description of the method embodiment, and therefore, repetition is not made herein.

The embodiments of the present application further provide an information notification device, applied to an IOAM node. The device includes a memory and at least one processor, where the memory is configured to store an information notification program. The information notification program, when read and executed by the processor, implements the above information notification method applied to the IOAM node side.

The embodiments of the present application further provide an information notification device, applied to an IOAM node. The device includes a transmission module, a memory and at least one processor, where the memory is configured to store an information notification program. The information notification program, when read and executed by the processor, implements the following operations: encapsulating IOAM capability information by using an extended BGP-LS or encapsulating the IOAM capability information by using a NETCONF; and sending a BGP-LS packet or a NETCONF message carrying the IOAM capability information to a predetermined node through the transmission module.

The processor may include, but is not limited to, a microcontroller unit (MCU), a field programmable gate array (FPGA) and another processing apparatus.

It should be understood by those of ordinary skill in the art that the above structure is merely illustrative and not intended to limit the structure of the electronic device described above. For example, the IOAM node may further include more or fewer components or have a different configuration.

The memory may be configured to store software programs and modules of application software, such as program instructions or modules corresponding to the information notification method in the present application. The processor executes the software programs and modules stored in the memory so as to perform various function applications and data processing, that is, to implement the method described above. The memory may include a high-speed random access memory, and may further include a nonvolatile memory, such as one or more magnetic storage apparatuses, flash memories or other nonvolatile solid-state memories. In some examples, the memory may include memories which are remotely disposed with respect to the processor and these remote memories may be connected to the IOAM node via a network. Examples of the preceding network include, but are not limited to, the Internet, an intranet, a local area network, a mobile communication network and a combination thereof.

The transmission module may be configured to receive or send data via a network. In one embodiment, the transmission module may be a radio frequency (RF) module, which is configured to communicate with the Internet in a wireless way.

The embodiments of the present application further provide an information notification device, applied to a predetermined node. The device includes a memory and at least one processor, where the memory is configured to store an information notification program. The information notification program, when read and executed by the processor, implements the above information notification method applied to the predetermined node side.

The embodiments of the present application further provide an information notification device, applied to a predetermined node (such as a controller in a network management system or a network manager in the network management system). The device includes a transmission module, a memory and at least one processor, where the memory is configured to store an information notification program. The information notification program, when read and executed by the processor, implements the following operations: receiving a BGP-LS packet or a NETCONF message sent by an IOAM node; and parsing IOAM capability information notified by the IOAM node in the BGP-LS packet or the NETCONF message.

The processor may include, but is not limited to, a MCU, a FPGA and another processing apparatus.

It should be understood by those of ordinary skill in the art that the above structure is merely illustrative and not intended to limit the structure of the electronic apparatus described above. For example, the predetermined node may further include more or fewer components or have a different configuration.

The memory may be configured to store software programs and modules of application software, such as program instructions or modules corresponding to the information notification method in the present application. The processor executes the software programs and modules stored in the memory so as to perform various function applications and data processing, that is, to implement the method described above. The memory may include a high-speed random access memory, and may further include a nonvolatile memory, such as one or more magnetic storage apparatuses, flash memories or other nonvolatile solid-state memories. In some examples, the memory may further include memories which are remotely disposed with respect to the processor and these remote memories may be connected to the predetermined node via a network. Examples of the preceding network include, but are not limited to, the Internet, an intranet, a local area network, a mobile communication network and a combination thereof. The transmission module may be configured to receive or send data via a network. In one embodiment, the transmission module may be a RF module, which is configured to communicate with the Internet in a wireless way.

In addition, the embodiments of the present application further provide a machine readable medium configured to store a computer program which, when executed by a processor, implements the information notification method applied to an IOAM node side or a predetermined node.

It should be understood by those of ordinary skill in the art that all or some steps in the methods described above may be implemented by relevant hardware (such as a processor) as instructed by programs, and the programs may be stored in a computer-readable storage medium, such as a read-only memory, a magnetic disk, an optical disk or the like. In an embodiment, all or part of the steps in the embodiments described above may also be implemented by using one or more integrated circuits. Accordingly, the modules or units in the embodiments described above may be implemented by hardware. For example, the functions of these modules or units may be implemented by one or more integrated circuits. Alternatively, these modules or units may be implemented by software function modules. For example, the functions of these modules or units may be implemented by using a processor to execute program instructions stored in a storage medium. The present application is not limited to any specific combination of hardware and software.

INDUSTRIAL APPLICABILITY

The embodiments of the present application can implement that a predetermined node is able to collect information of a node which supports an IOAM function in an IOAM domain.

What is claimed is:

1. An information notification method, applied to an In-band Operation Administration and Maintenance (IOAM) node and comprising:
encapsulating IOAM capability information by using an extended Border Gateway Protocol (BGP)-Link State (LS), or encapsulating the IOAM capability information by using a Network Configuration Protocol (NETCONF); and
sending a BGP-LS packet or a NETCONF message carrying the IOAM capability information to a predetermined node;
wherein the IOAM node refers to a node which supports an IOAM function in an IOAM domain, and the IOAM node comprises an IOAM encapsulation node, an IOAM forwarding node and an IOAM de-capsulation node; and
wherein the predetermined node is set outside the IOAM domain, and the predetermined node is a controller in a network management system or a network manager in the network management system.

2. The method of claim 1, wherein the encapsulating the IOAM capability information by using the extended the BGP-LS comprises:
adding at least one BGP-LS attribute; and
encapsulating the IOAM capability information by using the added at least one BGP-LS attribute.

3. The method of claim 2, wherein the added at least one BGP-LS attribute comprises at least one of: a node attribute, a prefix attribute, or a link attribute.

4. The method of claim 1, wherein the encapsulating the IOAM capability information by using the NETCONF comprises: encapsulating the IOAM capability information in a HELLO message of the NETCONF.

5. The method of claim 1, wherein the IOAM capability information comprises an IOAM type; wherein the IOAM type comprises: IOAM Tracing Option, IOAM Proof of Transit Option, or IOAM Edge-to-Edge Option.

6. The method of claim 5, wherein the IOAM capability information further comprises at least one of; IOAM Tracing Option Subtype, IOAM Proof of Transit Option Subtype, or IOAM Edge-to-Edge Option Subtype.

7. The method of claim 5, wherein in a case where the IOAM encapsulation node has interaction with the controller, the IOAM capability information comprises at least one of: an IOAM type of the IOAM encapsulation node, or an IOAM type of a predetermined IOAM node in the IOAM domain collected by the IOAM encapsulation node in advance.

8. An information notification method, applied to a predetermined node and comprising:
receiving a Border Gateway Protocol (BGP)-Link State (LS) packet or a Network Configuration Protocol (NETCONF) message sent by an in band Operation Administration and Maintenance (IOAM) node; and
parsing IOAM capability information notified by the IOAM node in the BGP-LS packet or the NETCONF message;
wherein the IOAM node refers to a node which supports an IOAM function in an IOAM domain, and the IOAM node comprises an IOAM encapsulation node, an IOAM forwarding node and an IOAM de-capsulation node; and
wherein the predetermined node is set outside the IOAM domain, and the predetermined node is a controller in a network management system or a network manager in the network management system.

9. The method of claim 8, wherein the IOAM capability information is encapsulated in an added BGP-LS attribute or carried in a HELLO message of a NETCONF.

10. The method of claim 9, wherein the added BGP-LS attribute comprises at least one of: a node attribute, a prefix attribute, or a link attribute.

11. The method of claim 8, wherein the IOAM capability information comprises an IOAM type; wherein the IOAM type comprises: IOAM Tracing Option, IOAM Proof of Transit Option, and IOAM Edge-to-Edge Option.

12. The method of claim 11, wherein the IOAM capability information further comprises at least one of: IOAM Tracing Option Subtype, IOAM Proof of Transit Option Subtype, or IOAM Edge-to-Edge Option Subtype.

13. The method of claim 11, wherein in a case where the IOAM encapsulation node has interaction with the controller, the IOAM capability information comprises at least one of: an IOAM type of the IOAM encapsulation node, or an IOAM type of a predetermined IOAM node in the IOAM domain collected by the IOAM encapsulation node in advance.

14. An information notification device, applied to an In band Operation Administration and Maintenance (IOAM) node, comprising: a memory and at least one processor, wherein the memory stores an information notification program, when the at least one processor executes the information notification program, the at least one processor performs:

Encapsulating IOAM capability information by using an extended BGP-LS, or encapsulate the IOAM capability information by using a NETCONF; and sending a BGP-LS packet or a NETCONF message carrying the IOAM capability information to a predetermined node;

wherein the IOAM node refers to a node which supports an IOAM function in an IOAM domain, and the IOAM node comprises an IOAM encapsulation node, an IOAM forwarding node and an IOAM de-capsulation node; and wherein the predetermined node is set outside the IOAM domain, and the predetermined node is a controller in a network management system or a network manager in the network management system.

15. An information notification device, comprising: a memory and at least one processor, wherein the memory stores an information notification program, when the at least one processor executes the information notification program, the at least one processor performs the information notification method as claimed in claim 8.

16. A non-transitory machine readable medium storing a computer program, wherein the computer program, when executed by a processor, implements the information notification method as claimed in claim 1.

17. A non-transitory machine readable medium storing a computer program, wherein the computer program, when executed by a processor, implements the information notification method as claimed in claim 8.

* * * * *